US008383260B2

(12) United States Patent
Essinger et al.

(10) Patent No.: US 8,383,260 B2
(45) Date of Patent: Feb. 26, 2013

(54) U-FORMED COOLING PLATE WITH SOLID FINS FOR LITHIUM POUCH CELLS

(75) Inventors: Reiner Essinger, Lautertal (DE); Rocco Schone, Nierstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 507 days.

(21) Appl. No.: 12/713,729

(22) Filed: Feb. 26, 2010

(65) Prior Publication Data
US 2011/0212355 A1    Sep. 1, 2011

(51) Int. Cl.
*H01M 10/50*    (2006.01)
(52) U.S. Cl. ....................................................... 429/120
(58) Field of Classification Search .................. None
See application file for complete search history.

(56) References Cited

U.S. PATENT DOCUMENTS

| 4,744,414 A * | 5/1988 | Schon | 165/167 |
| 2006/0091856 A1 * | 5/2006 | Lee et al. | 320/116 |

* cited by examiner

*Primary Examiner* — Jonathan Crepeau
(74) *Attorney, Agent, or Firm* — Fraser Clemens Martin & Miller LLC; J. Douglas Miller

(57) ABSTRACT

A cooling system for a battery pack module with a plurality of battery cells includes a cooling plate assembly having a first side wall and a second side wall spaced apart from one another. The first and second side walls are connected by a base wall. The first side wall, the second side wall and the base wall have at least one flow channel formed therein. The first side wall has an inlet in fluid communication with the flow channel. The second side wall has an outlet in fluid communication with the flow channel. The cooling plate assembly is configured to be placed in heat transfer communication with the battery cells disposed between the first and second side walls. The cooling plate assembly permits a coolant to flow into the inlet, through the at least one flow channel, and out of the outlet to regulate a temperature of the battery cells.

19 Claims, 8 Drawing Sheets

U-FORMED COOLING PLATE WITH SOLID FINS FOR LITHIUM POUCH CELLS

FIELD OF THE INVENTION

The present disclosure relates to a component for a battery pack module and more particularly to a cooling plate assembly for the battery pack module.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. A plurality of individual lithium-ion battery cells can be provided in a battery pack to provide an amount of power sufficient to operate electric vehicles.

Lithium-ion batteries are known to generate heat during operation and as a result of a charge cycle when recharging. When overheated or otherwise exposed to high-temperature environments, undesirable effects can impact the operation of lithium-ion batteries. Cooling systems are typically employed with lithium-ion battery packs to militate against the undesirable overheating conditions.

State of the art cooling systems have provided an indirect liquid cooling and heating of the lithium-ion battery packs through contact with cooling plates having liquid coolant running therethrough. However, the state of the art cooling systems are known to have complicated components, an undesirably high number of leak paths, complicated and non-robust cooling paths, a high number of seals including non-standard sealing connections, and a weight and volume that is undesirably high for electric vehicle applications.

There is a continuing need for a cooling system for a battery pack that is robust, has a minimized number of components, a minimized mass and volume, and a simplified manufacturing process. Desirably, the cooling system also facilitates a compression of the lithium ion battery pack, protects the battery pack while in operation, and enables a simple replacement of individual battery cells within the battery pack.

SUMMARY OF THE INVENTION

In concordance with the instant disclosure, a cooling system for a battery pack that is robust, has a minimized number of components, a minimized mass and volume, a simplified manufacturing process, and which facilitates a compression of the lithium ion battery pack, protects the battery pack while in operation, and enables a simple replacement of individual battery cells within the battery pack, is surprisingly discovered.

In one embodiment, a cooling system for a battery pack module with a plurality of battery cells includes a cooling plate assembly having a first side wall and a second side wall spaced apart from one another. The first side wall and the second side wall are connected by a base wall. The first side wall, the second side wall and the base wall have at least one flow channel formed therein. The first side wall has an inlet in fluid communication with the flow channel. The second side wall has an outlet in fluid communication with the flow channel. The cooling plate assembly is configured to be placed in heat transfer communication with the battery cells disposed between the first side wall and the second side wall. The cooling plate assembly permits a coolant to flow into the inlet, through the at least one flow channel, and out of the outlet to regulate a temperature of the battery cells.

In another embodiment, a battery pack module includes a cooling plate assembly having a first side wall and a second side wall spaced apart from one another and connected by a base wall. The first side wall, the second side wall and the base wall have at least one flow channel formed therein. The first side wall has an inlet in fluid communication with the flow channel. The second side wall has an outlet in fluid communication with the flow channel. The battery pack module further includes a plurality of battery cells disposed between the first side wall and the second side wall. The cooling plate assembly is in heat transfer communication with the battery cells, and permits a coolant to flow into the inlet, through the flow channel, and out of the outlet. A temperature of the battery cells is thereby regulated.

In a further embodiment, a power system includes a plurality of battery pack modules. Each of the battery pack modules has a cooling plate assembly with a first side wall and a second side wall spaced apart from one another and connected by a base wall. The first side wall, the second side wall and the base wall have at least one flow channel formed therein. The first side wall has an inlet in fluid communication with the flow channel. The second side wall has an outlet in fluid communication with the flow channel. A plurality of battery cells is disposed between the first side wall and the second side wall. The cooling plate assembly is in heat transfer communication with the battery cells, and permits a coolant to flow into the inlet, through the flow channel, and out of the outlet, to thereby regulate a temperature of the battery cells. The inlets of each of the battery pack modules are in fluid communication with a same coolant inlet conduit. The outlets of each of the battery pack modules are in fluid communication with a same coolant outlet conduit.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
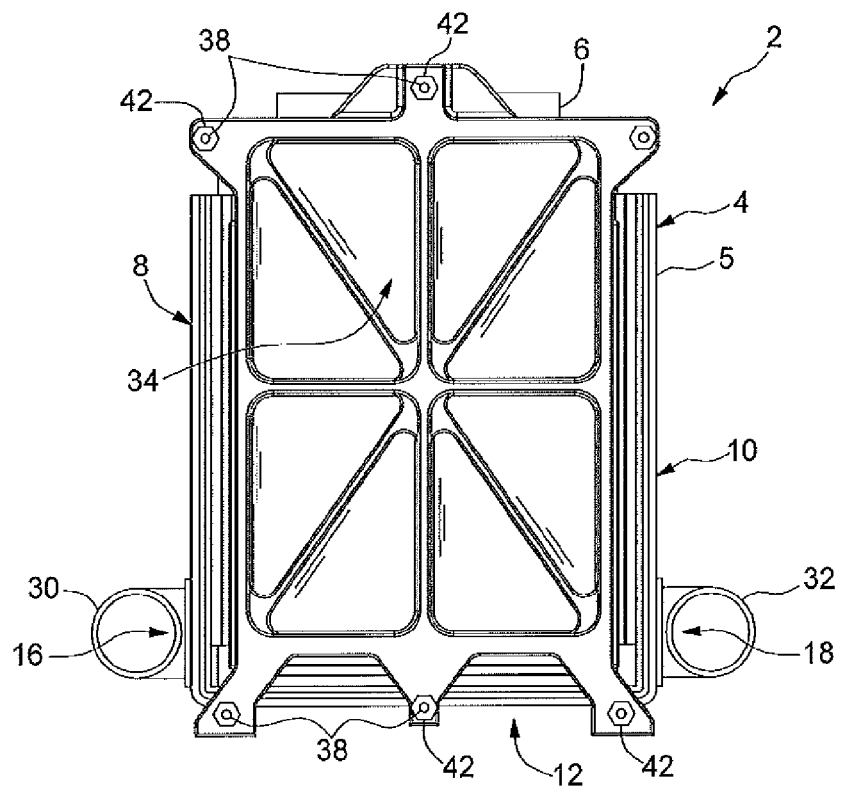
FIG. 1 is a front elevational view of a cooling system according to one embodiment of the present disclosure.
Figure 2:
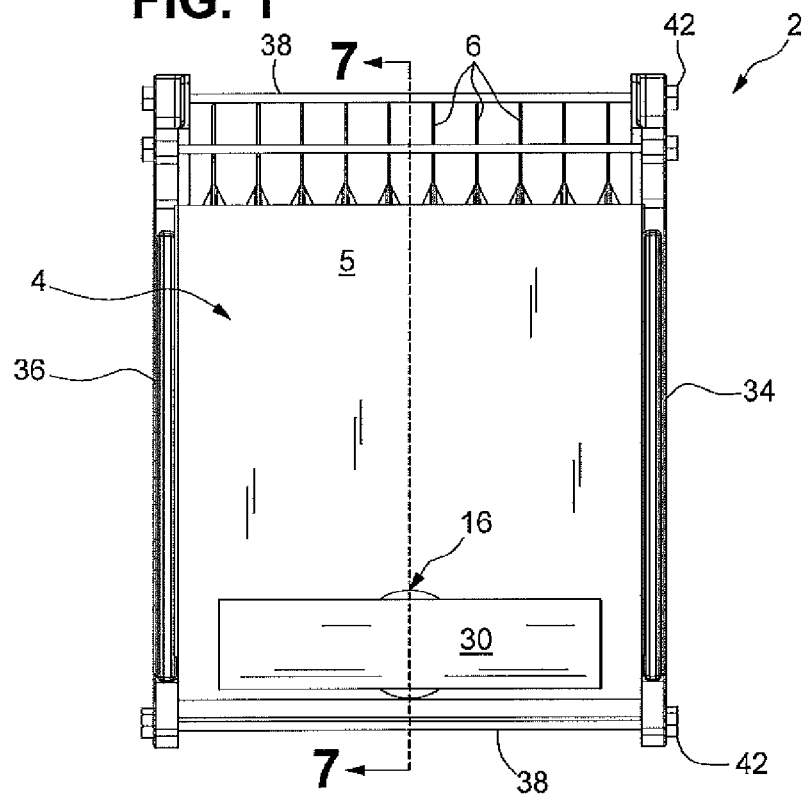
FIG. 2 is a side elevational view of the cooling system shown in FIG. 1.
Figure 3:
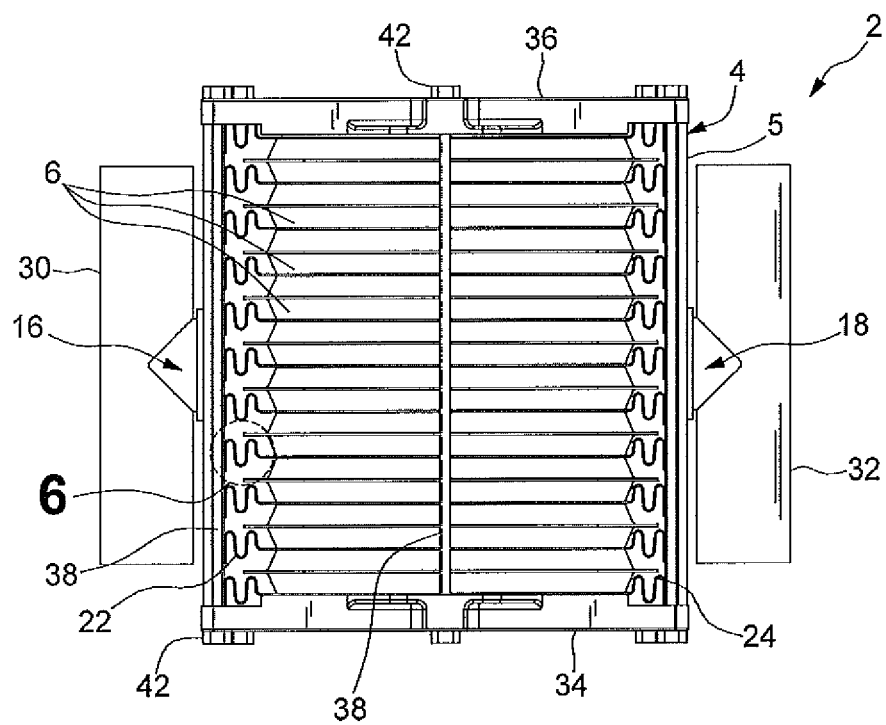
FIG. 3 is a top plan view of the cooling system shown in FIGS. 1 and 2.
Figure 4:
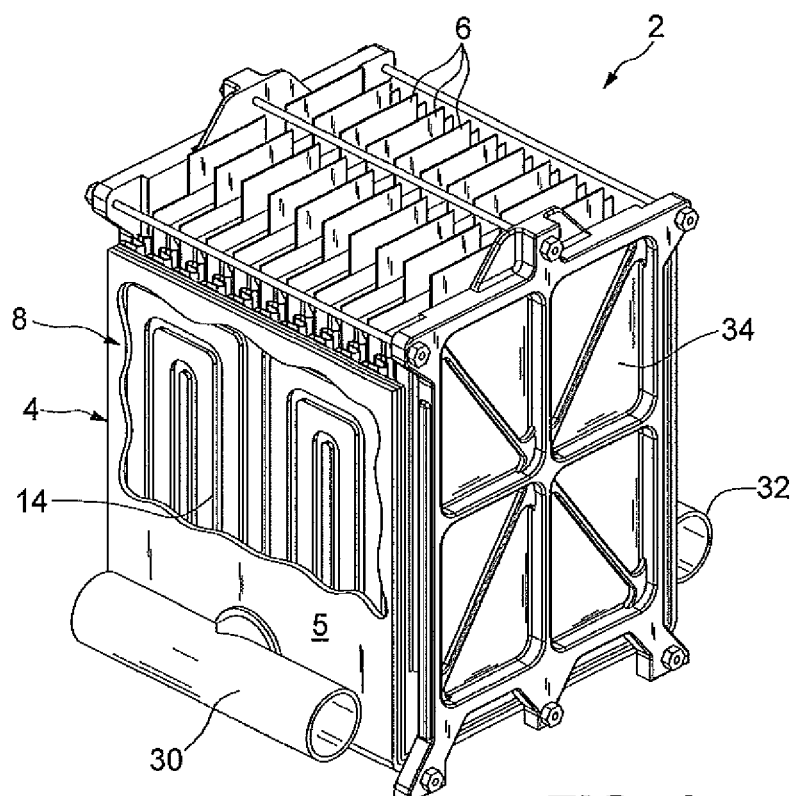
FIG. 4 is a top perspective view of the cooling system shown in FIGS. 1-3, with portions of a cooling plate assembly removed to show flow channels formed in the cooling plate assembly.
Figure 5:
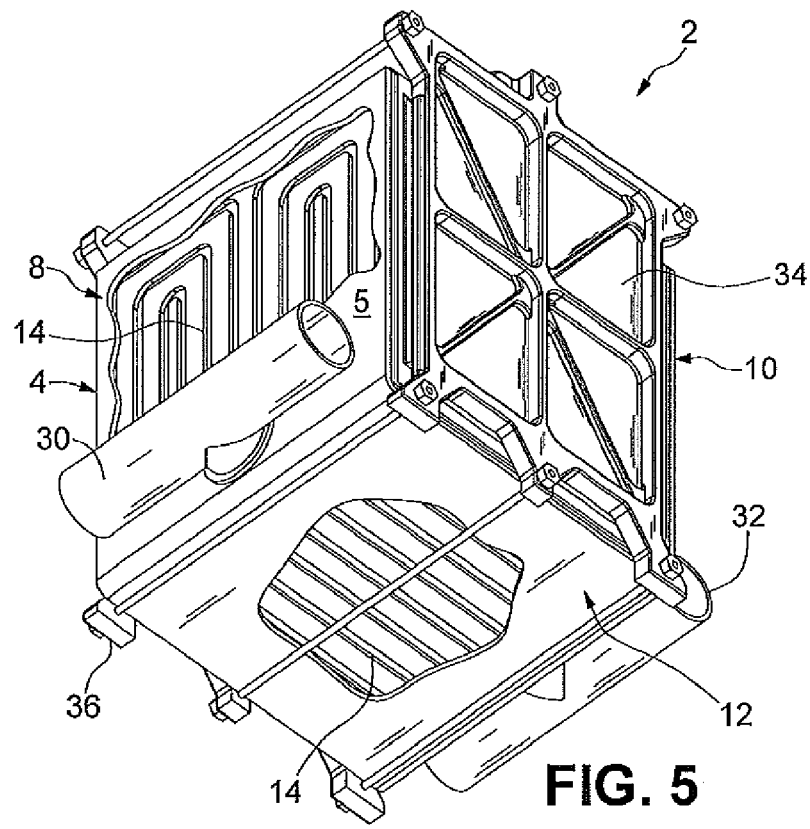
FIG. 5 is a bottom perspective view of the cooling system shown in FIGS. 1-4, with portions of a cooling plate assembly removed to show flow channels formed in the cooling plate assembly.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

As shown in FIGS. 1-12, a battery pack module 2 according to the present invention includes a cooling system 4 with a cooling plate assembly 5 in heat transfer communication with a plurality of battery cells 6. The battery cells 6 shown are prismatic battery cells. As a nonlimiting example, the battery cells 6 may be prismatic lithium ion (Li-ion) pouch cells. It should be appreciated that other battery cells 6, employing a different structure and electrochemistry, may also be used within the scope of the present invention.

Referring to FIGS. 1-5, the cooling plate assembly 5 of the cooling system 4 has a first side wall 8, a second side wall 10, and a base wall 12. The first side wall 8 and the second side wall 10 are spaced apart from one another and connected by the base wall 12. The cooling plate assembly 5 may have one of a rectilinear and a curvilinear profile. As a nonlimiting example, the first side wall 8 is substantially parallel with the second side wall 10, and the base wall 12 is substantially perpendicular to each of the first side wall 8 and the second side wall 10. The base wall 12 may also be disposed at a bottom end of each of the first side wall 8 and the second side wall 10. Where the base wall 12 is disposed at the bottom end of the first and second side walls 8, 10, the cooling plate assembly 5 may also have a plane of symmetry S (shown in FIG. 11) and a substantially U-shaped profile. Each of the first side wall 8, the second side wall, 10, and the base wall 12 has at least one flow channel 14 formed therein.

Figure 7:
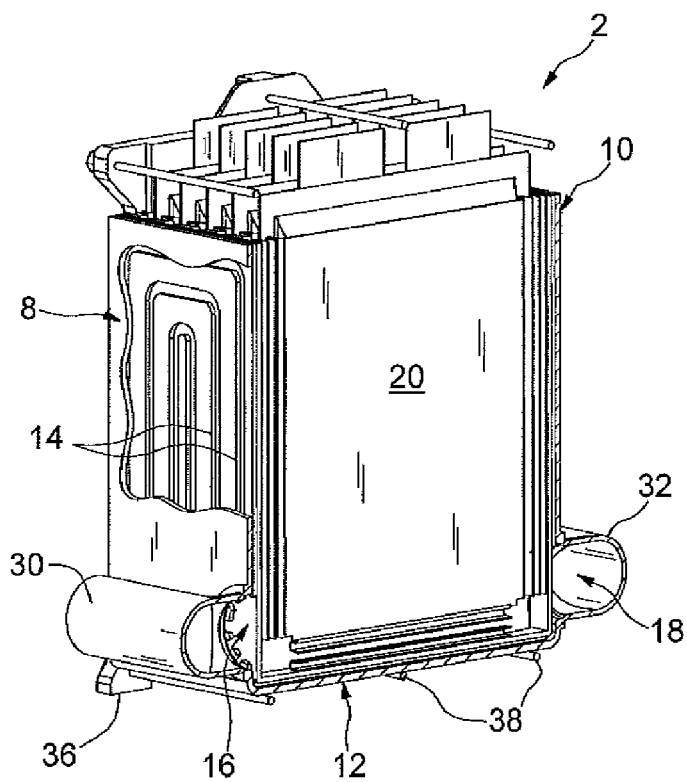
FIG. 7 is an enlarged, fragmentary, cross-sectional perspective view of the cooling system shown in FIG. 2 and taken along section line 7-7 thereof.

As shown in FIG. 7, the first side wall 8 has an inlet 16 formed therein in fluid communication with the at least one flow channel 14. The second side wall 10 has an outlet 18 formed therein in fluid communication with the at least one flow channel 14. The fluid communication between the at least one flow channel 14, the inlet 16, and the outlet 18 permits a coolant from a coolant source (not shown) to flow into the inlet 16, through the at least one flow channel 14, and out of the outlet 18.

With renewed reference to FIGS. 1-5, the battery cells 6 are disposed between the first side wall 8 and the second side wall 10. The battery cells 6 have electrical tabs that extend upwardly from an open top of the battery pack module 2, for example, for electrical connection to a vehicle electrical system (not shown). The cooling plate assembly 5 has a plurality of solid fins 20 that is also disposed between the first side wall 8 and the second side wall 10. Each of the plurality of solid fins 20 is sufficiently spaced apart from an other of the solid fins 20 to permit one of the battery cells 6 to be disposed therebetween. For example, individual ones of the battery cells 6 are inserted between individual ones of the plurality of solid fins 20 when the battery pack module 2 is assembled. The solid fins 20 abut the battery cells 6 and are in heat transfer communication with at least one of the first side wall 8, the second side wall 10, and the base wall 12 of the cooling plate assembly 5. In one embodiment, the solid fins 20 are in heat transfer communication with each of the first side wall 8, the second side wall 10, and the base wall 12 of the cooling plate assembly. In a particularly illustrative embodiment, the solid fins 20 are in substantially full surface contact with the battery cells 6. Heat transfer occurs from the battery cells 6 to the solid fins 20 and into the cooling plate assembly 5. It should be appreciated that the cooling plate assembly 5 is thereby placed in heat transfer communication with the battery cells 6 for regulation of a temperature of the battery cells 6 in the battery pack module 2.

Each of the solid fins 20 may be joined with the first side wall 8 and the second sidewall 10 of the cooling plate assembly 5. The solid fins 20 may also be joined to the base wall 12. It should be appreciated that a full contact of the solid fins 20 to each of the first side wall 8, the second side wall 10, and the base wall 12 without any gaps, may facilitate heat transfer communication. The solid fins 20 may be joined with the first side wall 8, the second side wall 10, and the base wall 12 by at least one of brazing, welding, and adhesive bonding, for example. Other suitable means for joining the solid fins 20 to the cooling plate assembly 5 may be employed, as desired.

Figure 6:
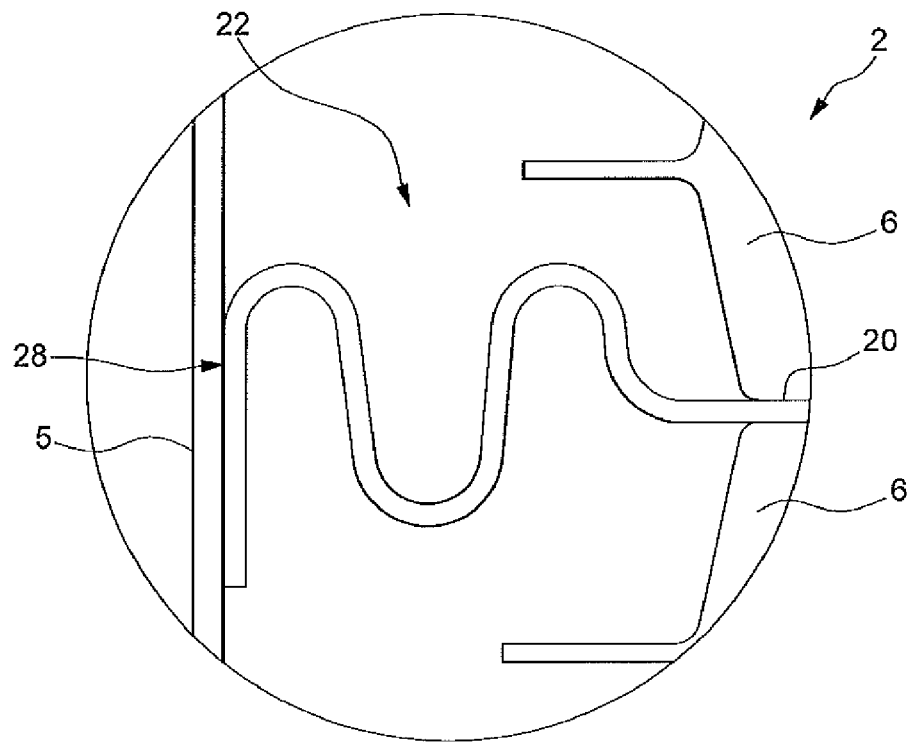
FIG. 6 is an enlarged, fragmentary view of solid fins in the cooling system shown in FIG. 3 and indicated by circle 6 thereof, according to one embodiment of the present disclosure.

In an illustrative embodiment shown in FIG. 6, each of the solid fins 20 has a first spring portion 22 abutting the first side wall 8, and a second spring portion 24 abutting the second side wall 10. A third spring portion 26 (shown in FIGS. 8 and 9) of the solid fin 20 may also abut the base wall 14 of the cooling plate assembly 5. Each of the first spring portion 22, the second spring portion 24, and the third spring portion 26 may have a terminal end 28 that is substantially parallel with the respective ones of the first side wall 8, the second side wall 10, and the base wall 12. The terminal end 28 may be substantially parallel with and abut a surface of the first side wall 8, the second side wall 10, or the base wall 12. Where the terminal end 28 is substantially parallel with and abuts a surface of the first side wall 8, the second side wall 10, or the base wall 12, the terminal end 28 may also provide a maximized surface area for joining the solid fins 20 with the cooling plate assembly 5 as described hereinabove, for example, by brazing, welding, or adhesive bonding.

The first spring portion 22, the second spring portion 24, and the third spring portion 26 are shaped to permit a flexing of the solid fins 20 sufficient to compensate for a change in the dimensions of the battery cells 6, for example, due to variation in manufacturing tolerances or thermal thickness expansion of the battery cells 6 during operation thereof. At least one of the first spring portion 22, the second spring portion 24, and the third spring portion 26 may be substantially serpentine or S-shaped, for example. One of ordinary skill in the art may employ other suitable spring shapes, as desired.

Figure 12:
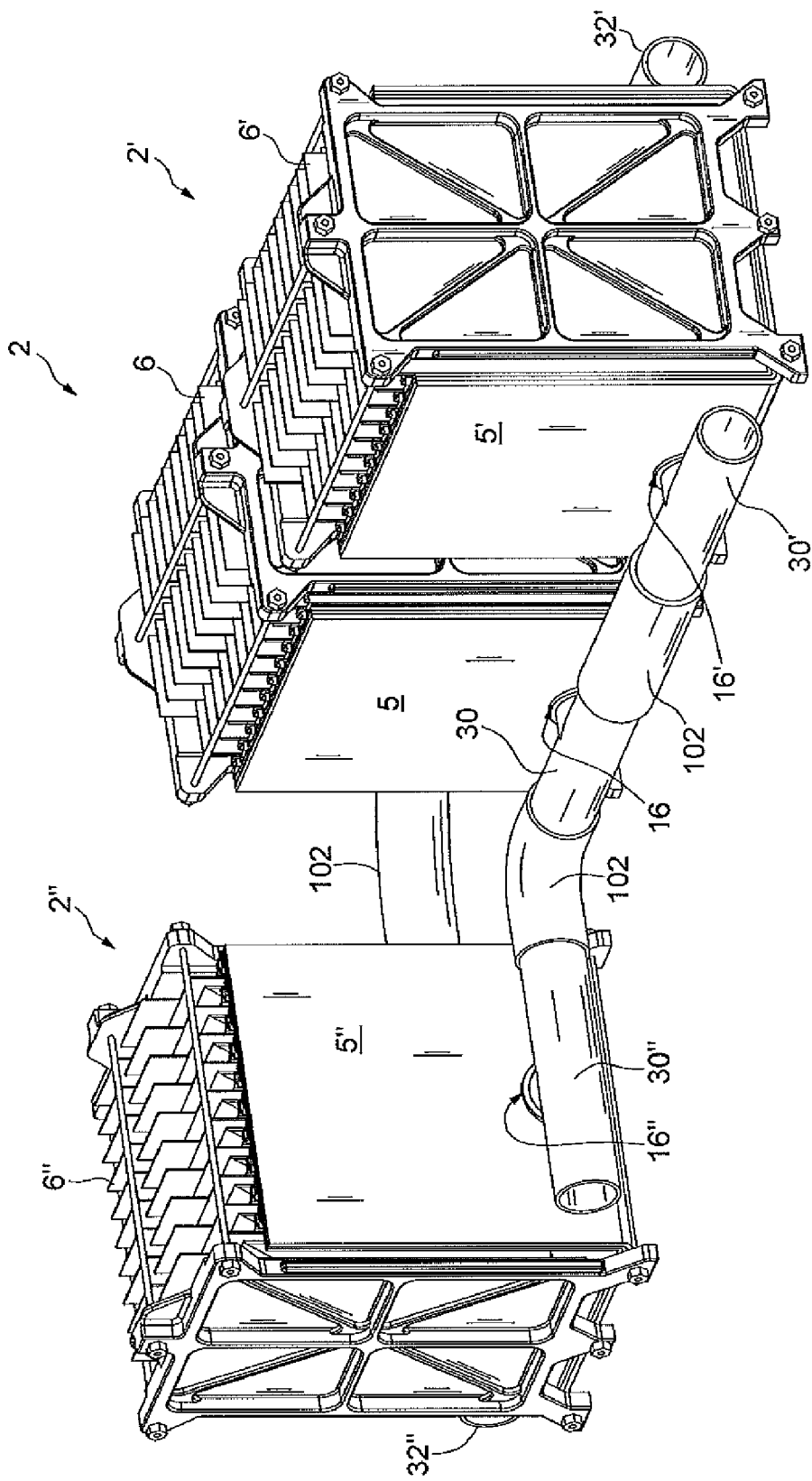
FIG. 12 is a top perspective view of the cooling system according to another embodiment of the present disclosure, including a plurality of units interconnected with coolant conduits.

The cooling system 4 for the battery pack module 2 further includes a coolant inlet conduit 30 and a coolant outlet conduit 32. The coolant inlet conduit 30 is in fluid communication with the inlet 16 formed in the first side wall 8 of the coolant plate 5. The coolant outlet conduit 32 is in fluid communication with the outlet 18 formed in the second side wall 10 of the coolant plate 5. The coolant inlet conduit 30 and the coolant outlet conduit 32 are in fluid communication with the coolant source and suitable coolant delivery means such as pumps and the like. The coolant inlet conduit 30 and the coolant outlet conduit 32 thereby facilitate the transport of coolant between the coolant source and the battery pack module 2. The coolant inlet conduit 30 and the coolant outlet conduit 32 also may transport coolant to and from at least one additional battery pack module 2 in fluid communication with the battery pack module 2, for example, as shown in FIG. 12.

The cooling system 4 for the battery pack module 2 also includes a first end plate 34 and a second end plate 36. The first end plate 34 and the second end plate 36 are disposed at opposite ends of the cooling plate assembly 5, and provide a structural rigidity to the battery pack module 2. Where the cooling plate assembly 5 has a substantially U-shaped profile, the cooling plate 5 cooperates with the first end plate 34 and the second end plate 36 to form an open-top module within which the battery cells 6 may be readily inserted or removed, for example, for individual replacement following a period of operation.

The first end plate 34 and the second end plate 36 may be connected, for example, by a plurality of tie rods 38. The plurality of tie rods 38 enable a specific load to be applied to the battery cells 6. The plurality of tie rods 38 may also further contribute to the structural rigidity of the battery pack module 2. Individual ones of the tie rods 38 may be disposed above or below at least one of the battery cells 6, the solid fins 20, and the cooling plate assembly 5, to further secure the same therebetween. Other means for connecting the first end plate 34 and the second end plate 36 may also be used, as desired.

Figure 8:
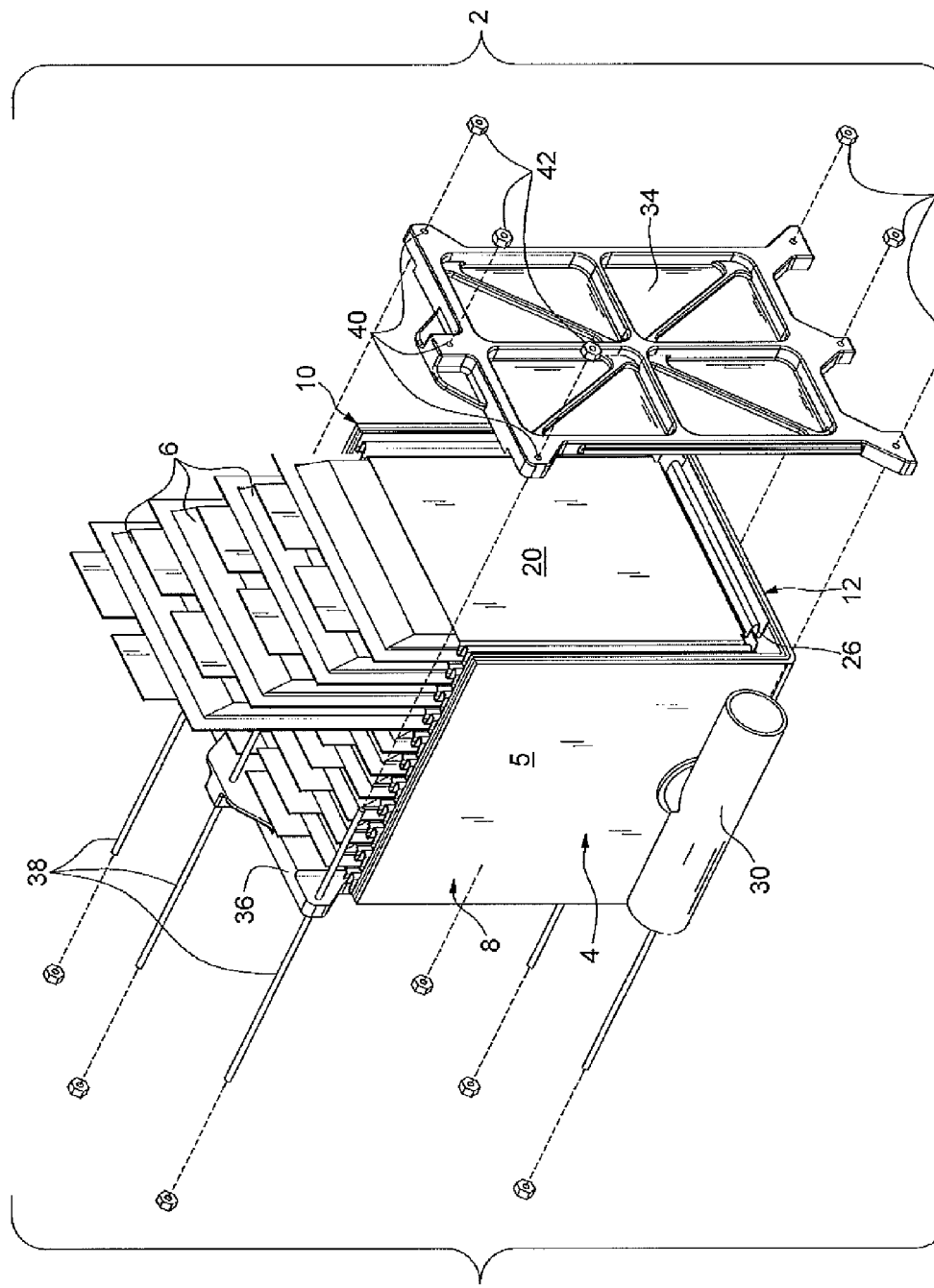
FIG. 8 is a partially exploded, top perspective view of the cooling system shown in FIG. 7, further illustrating a method for assembly of the cooling system with portions of a cooling plate assembly removed to show flow channels formed in the cooling plate assembly.

As illustrated in FIG. 8, also showing the insertion of the battery cells 6 between the solid fins 20, the tie rods 38 may have threaded ends that are disposed through bolt holes 40 in each of the first end plate 34 and the second end plate 36. The tie rods 38 may be secured to the first end plate 34 and the second end plate 36 with nuts 42 to place the battery cells 6 of the battery pack module 2 under compression. Other means for fastening the tie rods 38 to the first end plate 34 and the second end plate 36 may be employed.

Figure 9:
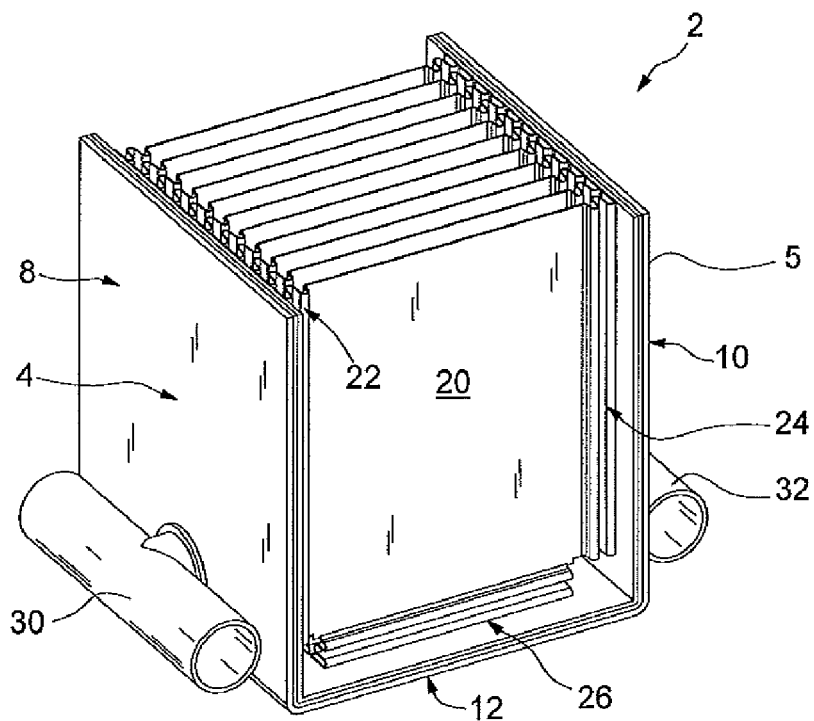
FIG. 9 is a top perspective view of the cooling system shown in FIGS. 1-8, further illustrating the cooling system without battery cells, end plates, and tie rods.
Figure 10:
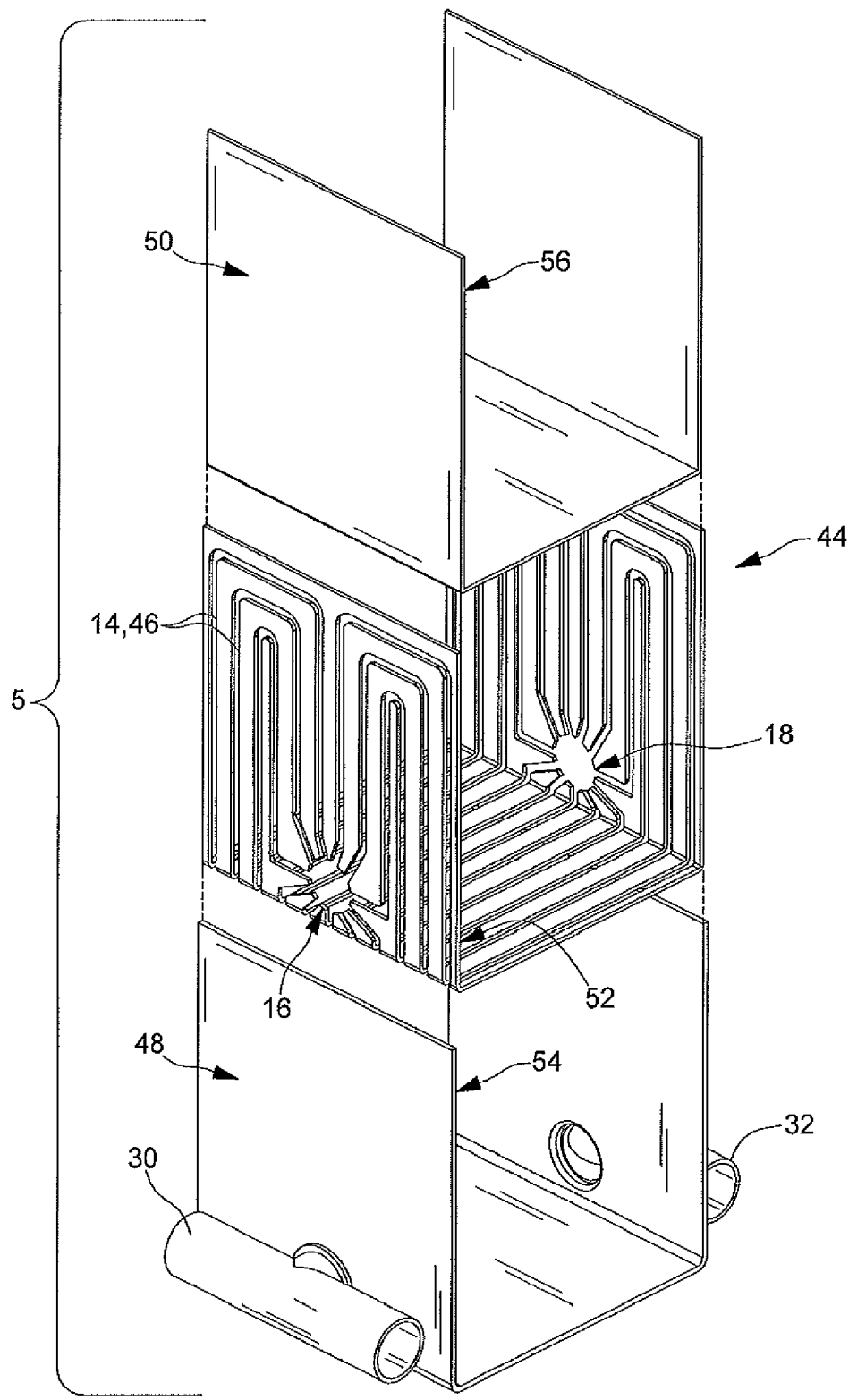
FIG. 10 is an exploded, top perspective view of the cooling system shown in FIG. 9 without the solid fins.

Referring to FIGS. 9 and 10, the cooling plate assembly 5 may be assembled from an inner plate 44 having grooves 46 formed therein. The grooves 46 define the at least one flow channel 14. The inner plate 44 may be formed by stamping, for example, to provide the grooves 46. The grooves may have a substantially constant width or a varying width, for example, to provide a substantially constant pressure drop across the cooling plate assembly 5 in operation.

The inner plate 44 is disposed between a first outer plate 48 and a second outer plate 50. As a nonlimiting example, each of the inner plate 44, the first outer plate 48, and the second outer plate 50 may have a substantially U-shaped profile. The inner plate 44 and the first outer plate 48 may also have apertures disposed therein that cooperate to form the inlet 16 and the outlet 18 of the cooling plate assembly 5. Like the grooves 46, the apertures cooperating to form the inlet 16 and the outlet 18 may also be stamped. Suitable materials for the inner plate 44 and the outer plates 48, 50 may include aluminum or stainless steel, although a skilled artisan understands that other materials having suitable corrosion resistance in a cooling system environment may also be used.

The inner plate 44, the first outer plate 48, and the second outer plate 50 may have a thickness that both facilitates a protection of the battery cells 6 and a heat transfer from the battery cells 6. As nonlimiting examples, the inner plate 44 may have a thickness of between about 0.1 mm and about 1.0 mm, particularly between about 0.2 mm and 0.8 mm, and most particularly about 0.4 mm. Likewise, the first and second outer plates 48, 50 may have a thickness of between about 0.05 mm and 0.5 mm, particularly between about 0.1 mm and about 0.3 mm, and most particularly about 0.2 mm. Other suitable thicknesses of the inner plate 44, the first outer plate 48, and the second outer plate 50 may also be employed.

At least a perimeter 52, 54, 56 of each of the inner plate 44, the first outer plate 48, and the second outer plate 50 is joined to provide a fluid tight seal. For example, the perimeters 52, 54, 56 may be joined by at least one of brazing and welding. Adhesive bonding of the perimeters 52, 54, 56 may also be employed. In a particular embodiment, a full surface joining of the inner plate 44 and the outer plates 48, 50 provides the substantially fluid tight seal. The joining is configured to provide complete leak tightness at approximately one (1) bar of system pressure. The cooling inlet conduit 30 and the coolant outlet conduit 32 may also be joined to the first outlet plate 50 in a same or different fluid tight manner, as desired.

Figure 11:
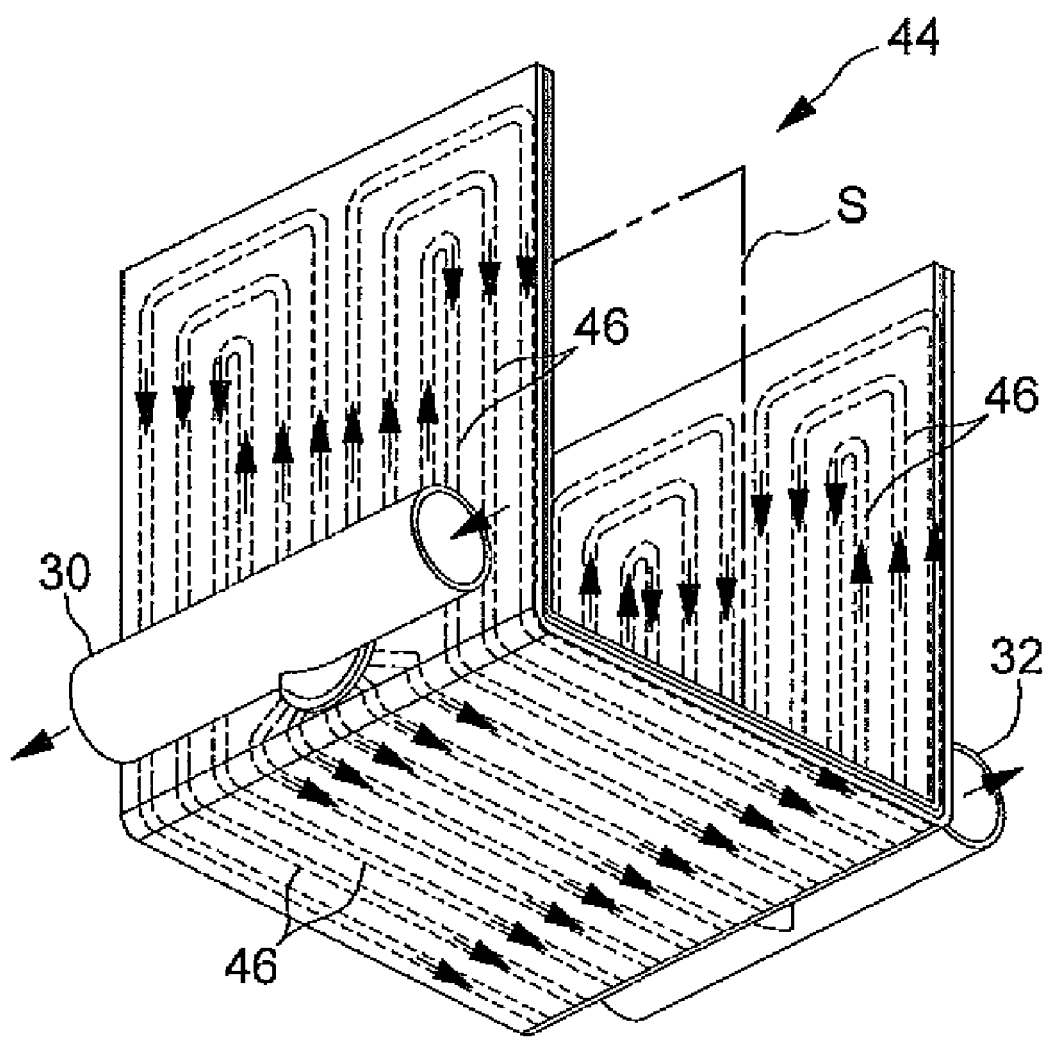
FIG. 11 is a schematic representation of coolant flow through the cooling system shown in FIGS. 1-10 of the present disclosure, with a direction of coolant flow indicated generally by arrowed lines.

As shown in FIG. 11, the grooves 46 of the inner plate 44 form the at least one flow channel 14, and thereby provide a path for flow of the coolant into the inlet 16, through the cooling plate assembly 5, and out of the outlet 18 when the inner plate 44 and the outer plates 48, 50 are joined with the fluid tight seal. The grooves 46 and resulting flow channels 14 may be selectively positioned within the cooling plate assembly 5 to be aligned with the terminal ends 28 of the solid fins 20, and thereby facilitate heat transfer communication therebetween. For example, the at least one flow channel 14 may follow one of a substantially linear path and a tortuous path through at least one of the first side wall 8, the second side wall 10, and the base wall 12. As illustratively shown in FIG. 11, the at least one flow channel 14 may follow a tortuous path through the first side wall 8 and the second side wall 10, and a substantially linear path through the base wall 12. A skilled artisan may form the at least one flow channel 14 in the cooling plate assembly 5 in other suitable configurations, as desired.

With reference to FIG. 12, another embodiment according to the present disclosure is described. For purpose of clarity, like or related structures repeated from FIGS. 1-11 have the same reference numerals and are denoted with a prime (') symbol or a double-prime (") symbol.

The present disclosure includes a power system 100 having a plurality of battery pack modules 2, 2', 2" with cooling plate assemblies 5, 5', 5" according to the present disclosure. Each of the plurality of battery pack modules 2, 2', 2" is in electrical communication with the others of the plurality of battery pack modules 2, 2', 2". In combination, the battery pack modules 2, 2', 2" of the power system 100 provide an electrical power sufficient to operate an electric vehicle.

The cooling plate assemblies 5, 5', 5" of the power system 100 may share coolant from the coolant source via the respective coolant inlet conduits 30, 30', 30" and the respective cooling outlet conduits 32, 32', 32" of the battery pack modules 2, 2', 2". The coolant inlet conduits 30, 30', 30" may be connected to form a same cooling inlet conduit 30, 30', 30". The cooling outlet conduits 32, 32', 32" may be connected to form a same cooling outlet conduit 32, 32', 32". For example, the coolant inlet conduits 30, 30', 30" and the cooling outlet conduits 32, 32', 32" may be connected via hoses 102, and be in fluid communication with the inlets 16, 16',16" and outlets 18, 18',18" of the cooling plate assemblies 5, 5', 5" as described hereinabove. It should be understood that the cooling plate assemblies 5, 5', 5" may also be supplied coolant individually within the scope of the present disclosure. The temperature of the battery cells 6, 6', 6" of the battery pack modules 2, 2', 2" may thereby be maintained substantially the same for each of the battery pack modules 2, 2', 2", as desired.

It is advantageously found that a sufficient temperature and compression control is provided by the battery pack module 2 of the present disclosure. For example, temperature control is provided by placing the solid fins 20 in substantially full surface contact with the battery cells 6 of the battery pack module 2. The battery pack module 2 is further capable of providing the desired compression to the battery cells 6, for example, through tightening of the nuts 42 on the threaded tie rods 38. The temperature and compression control facilitates a warranty of function and a maximization of the usable life of lithium ion battery cells 6 in particular, which have been found to be affected by the temperature history and the specific load applied to the battery cells 6.

Advantageously, the cooling plate assembly 5 and the associated battery pack module 2 and power system 100 of the present disclosure may be manufactured with fewer components as compared to cooling systems of the prior art, thereby providing for a reduction in total system volume and weight. The cooling plate assembly 5 may also be pre-assembled by brazing, for example, prior to incorporation into the battery pack module 2.

It should be understood that the employment of welding, brazing, or adhesive bonding provides a simplified manufacturing process that does not require additional seal components. A skilled artisan should further understand that, particularly with respect to brazing, the joining of each of the inner plate 44, the first outer plate 48, the second outer plate 50, and the solids fins 20 may advantageously be conducted simultaneously, and further minimize an assembly time while providing a robust and compact battery pack module 2.

While certain representative embodiments and details have been shown for purposes of illustrating the invention, it will be apparent to those skilled in the art that various changes may be made without departing from the scope of the disclosure, which is further described in the following appended claims.

What is claimed is:

1. A cooling system for a battery pack module having a plurality of battery cells, the cooling system comprising:
    a cooling plate assembly having a first side wall and a second side wall spaced apart from one another and connected by a base wall, the first side wall, the second side wall and the base wall having at least one flow channel formed therein, the first side wall having an inlet in fluid communication with the flow channel, the second side wall having an outlet in fluid communication with the flow channel, wherein the cooling plate assembly is configured to be placed in heat transfer communication with the battery cells disposed between the first side wall and the second side wall, and permit a coolant to flow into the inlet, through the flow channel, and out of the outlet, to thereby regulate a temperature of the battery cells; and
    a plurality of solid fins disposed between the first side wall and the second side wall.

2. The cooling system of claim 1, wherein the cooling plate assembly has one of a rectilinear and a curvilinear profile.

3. The cooling system of the claim 2, wherein the first side wall is substantially parallel with the second side wall, and the base wall is substantially perpendicular to each of the first side wall and the second side wall, the base wall disposed at an end of each of the first side wall and the second side wall.

4. The cooling system of claim 3, wherein the cooling plate assembly has a substantially U-shaped profile.

5. The cooling system of claim 1, wherein each of the solid fins is joined with the first side wall and the second sidewall, and sufficiently spaced apart from one another to permit one of the battery cells to be disposed between individual ones of the solid fins.

6. The cooling system of claim 1, wherein each of the solid fins has a first spring portion abutting the first side wall and a second spring portion abutting the second side wall.

7. The cooling system of claim 6, wherein each of the first spring portion and the second spring portion is substantially S-shaped.

8. The cooling system of claim 6, wherein each of the solid fins includes a third spring portion abutting the base wall.

9. The cooling system of claim 8, wherein the first spring portion is joined with the first side wall, the second spring portion is joined with the second side wall, and the third spring portion is joined with the base wall.

10. The cooling system of claim 1, further comprising a coolant inlet conduit in fluid communication with the inlet of the first sidewall, and a coolant outlet conduit in fluid communication with the outlet of the second sidewall.

11. The cooling system of claim 1, wherein the cooling plate assembly includes an inner plate having grooves formed therein that define the at least one flow channel, the inner plate disposed between a pair of outer plates, the inner plate and the outer plates joined to provide a fluid tight seal.

12. The cooling system of claim 11, wherein the inner plate and the outer plates are joined by at least one of adhesive bonding, welding, and brazing.

13. The cooling system of claim 1, wherein the at least one flow channel follows a tortuous path through the first side wall and the second side wall, and a substantially linear path through the base wall.

14. A battery pack module, comprising:
    a cooling plate assembly having a first side wall and a second side wall spaced apart from one another and connected by a base wall, the first side wall, the second side wall and the base wall having at least one flow channel formed therein, the first side wall having an inlet in fluid communication with the flow channel, the second side wall having an outlet in fluid communication with the flow channel,
    a plurality of solid fins disposed between the first side wall and the second side wall; and
    a plurality of battery cells disposed between the first side wall and the second side wall, wherein the cooling plate assembly is in heat transfer communication with the battery cells, and permits a coolant to flow into the inlet, through the flow channel, and out of the outlet, to thereby regulate a temperature of the battery cells.

15. The battery pack module of claim 14, wherein each of the solid fins is joined with the first side wall and the second sidewall, one of the battery cells disposed between individual ones of the solid fins and in heat transfer communication therewith.

16. The battery pack module of claim 15, further comprising a first end plate and a second end plate disposed at opposite ends of the cooling plate assembly to provide a structural rigidity to the battery pack module.

17. The battery pack module of claim 16, wherein the first end plate and the second end plate are connected by a plurality of tie rods, the tie rods disposed between the first end plate and the second end plate, the tie rods further disposed above and below the cooling plate assembly to hold the cooling plate assembly between the first end plate and the second end plate.

18. The battery pack module of claim 17, wherein the first end plate, the second end plate, and the cooling plate assembly cooperate to form an open-top module within which the battery cells may be readily one of inserted and removed.

19. A power system, comprising:
a plurality of battery pack modules, each of the battery pack modules including a cooling plate assembly having a first side wall and a second side wall spaced apart from one another and connected by a base wall, the first side wall, the second side wall and the base wall having at least one flow channel formed therein, the first side wall having an inlet in fluid communication with the flow channel, the second side wall having an outlet in fluid communication with the flow channel, a plurality of solid fins disposed between the first side wall and the second side wall, and a plurality of battery cells disposed between the first side wall and the second side wall, wherein the cooling plate assembly is in heat transfer communication with the battery cells, and permits a coolant to flow into the inlet, through the flow channel, and out of the outlet, to thereby regulate a temperature of the battery cells,
wherein the inlets of each of the battery pack modules are in fluid communication with a same coolant inlet conduit, and the outlets of each of the battery pack modules are in fluid communication with a same coolant outlet conduit.

* * * * *